UNITED STATES PATENT OFFICE.

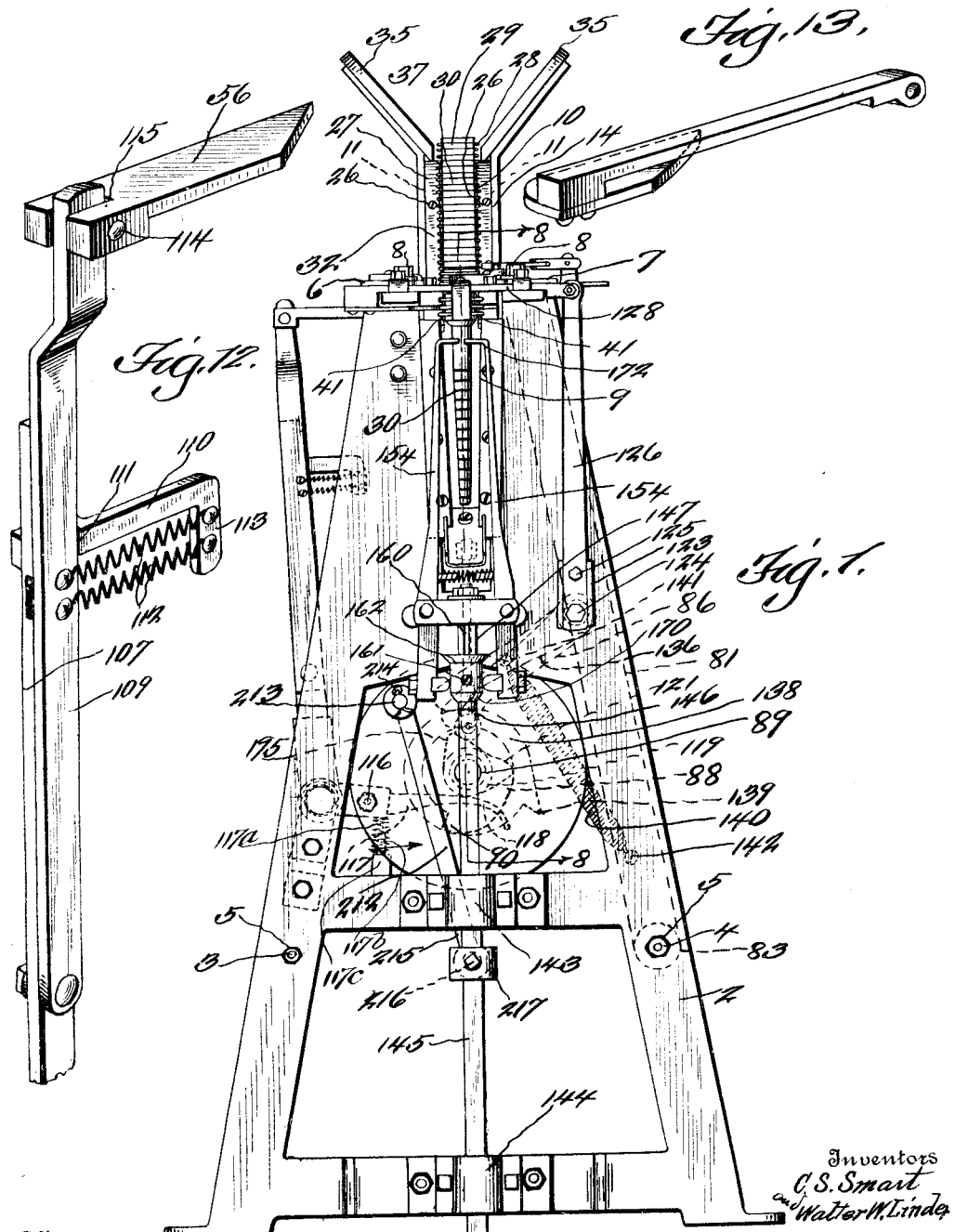

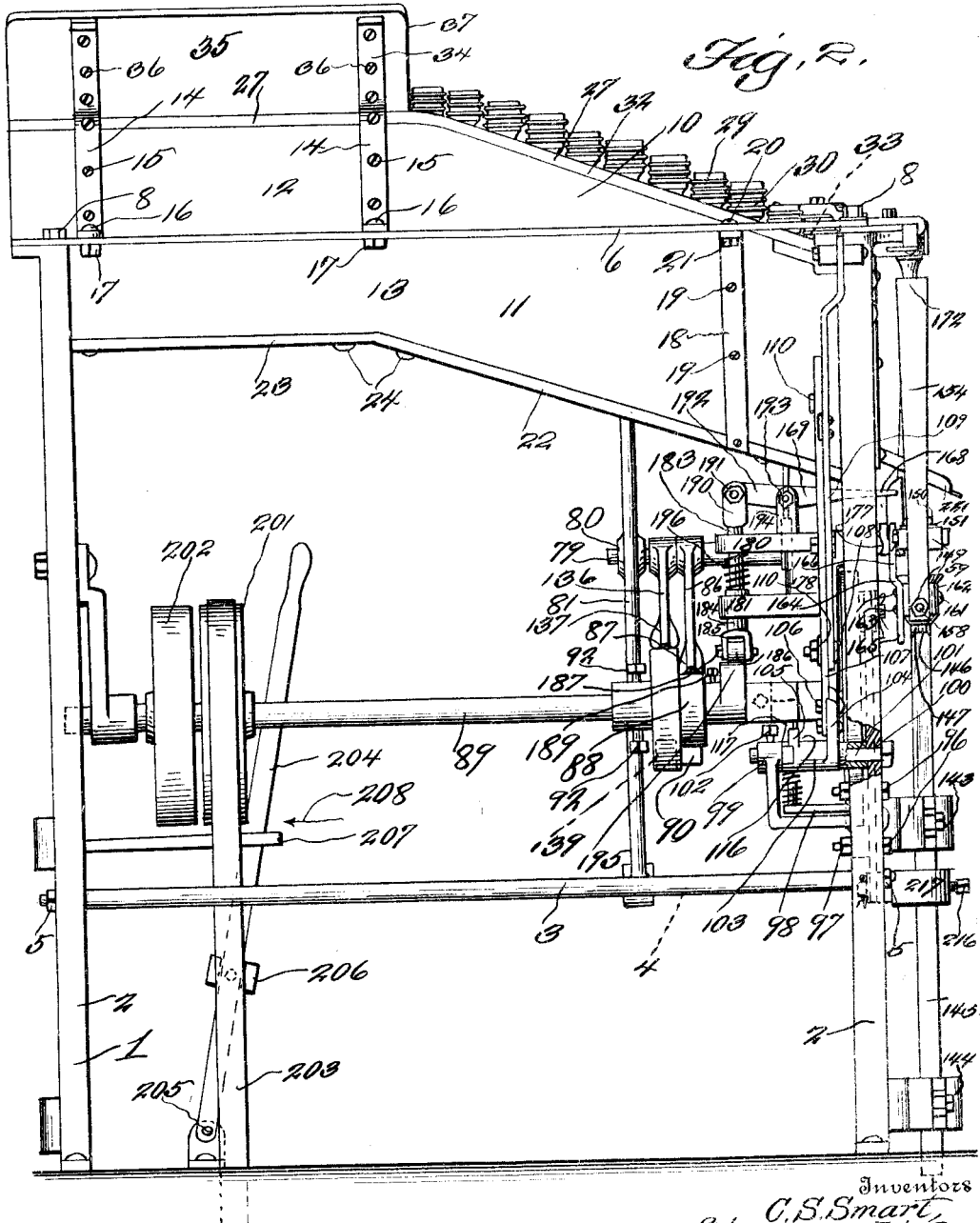

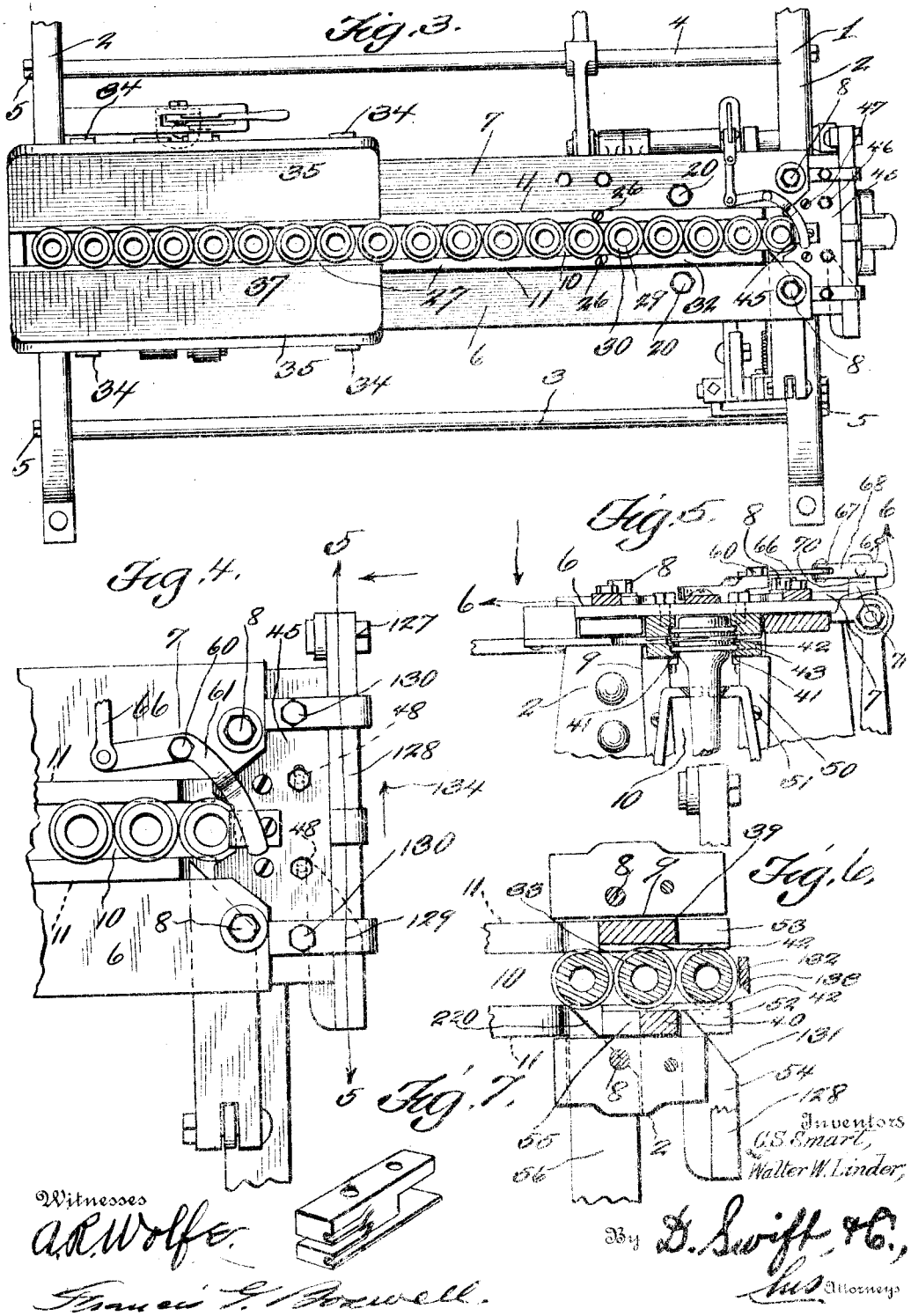

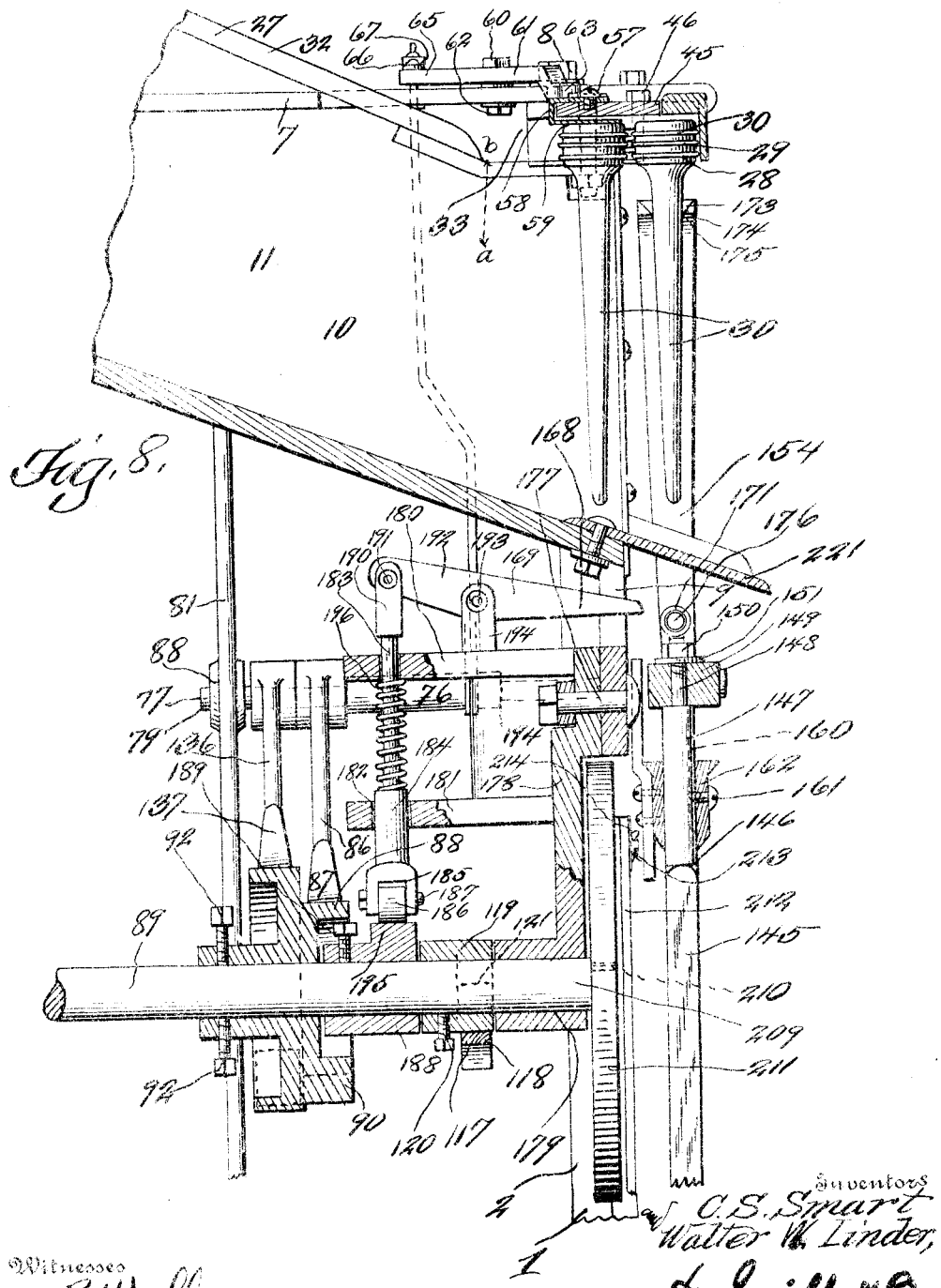

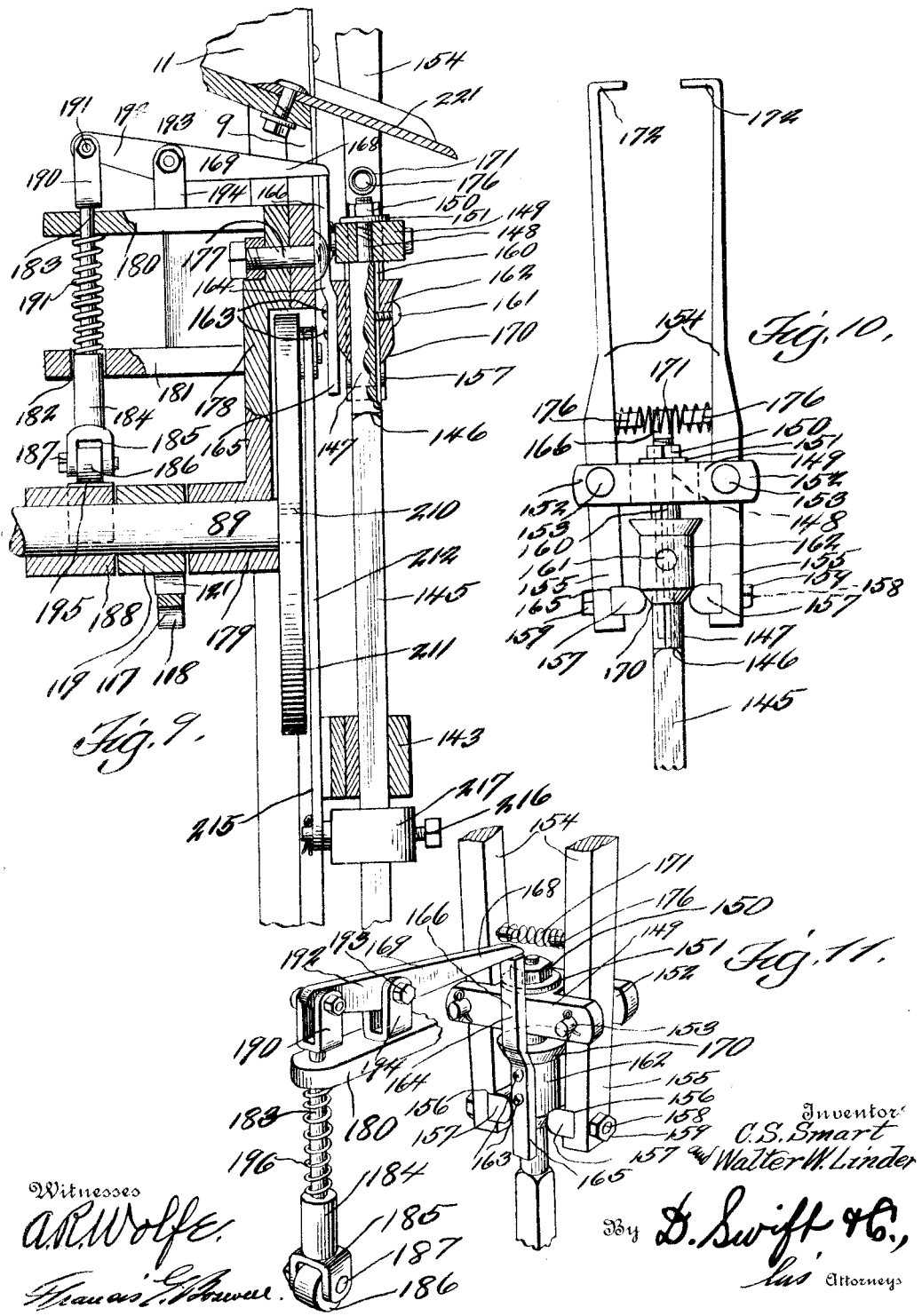

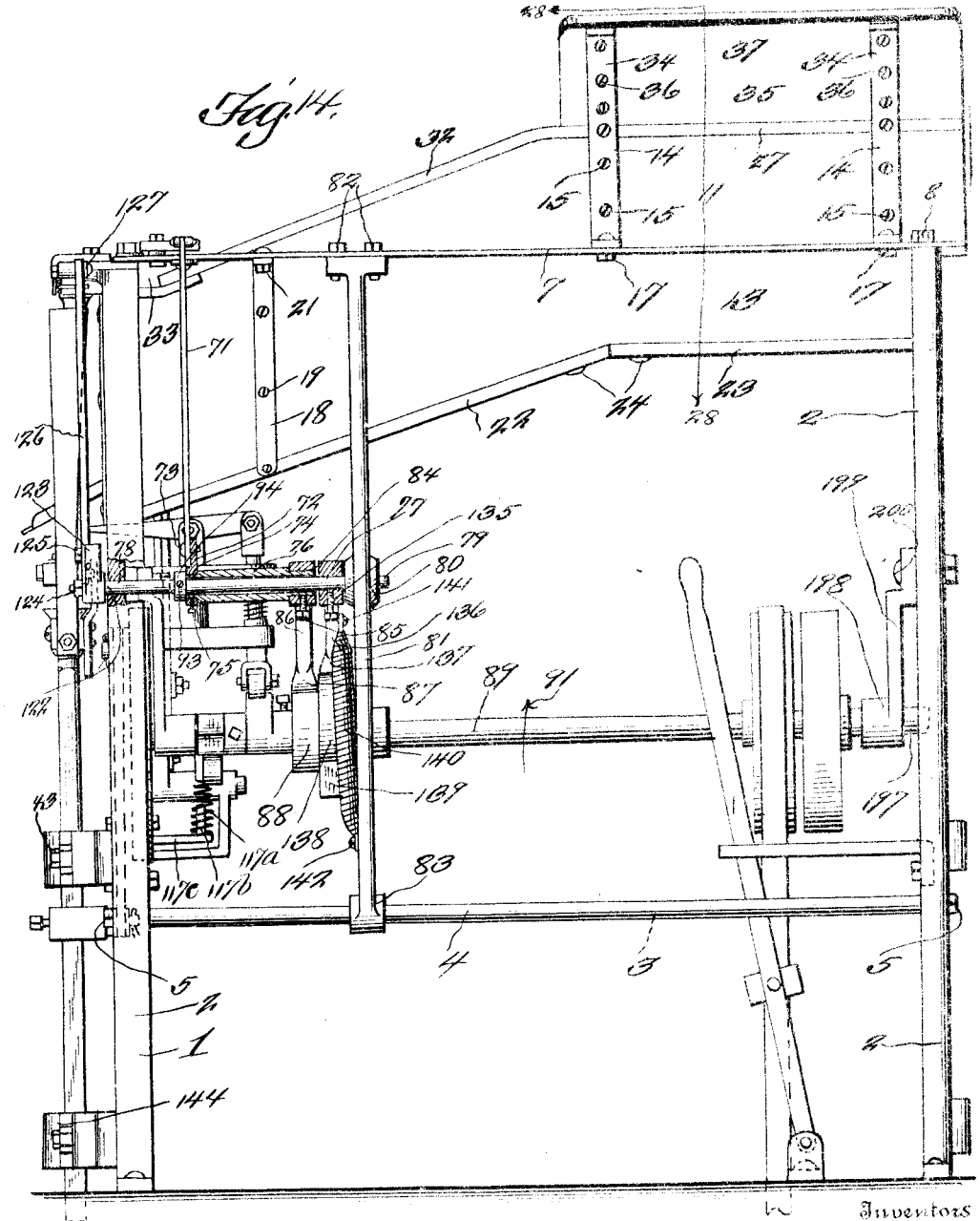

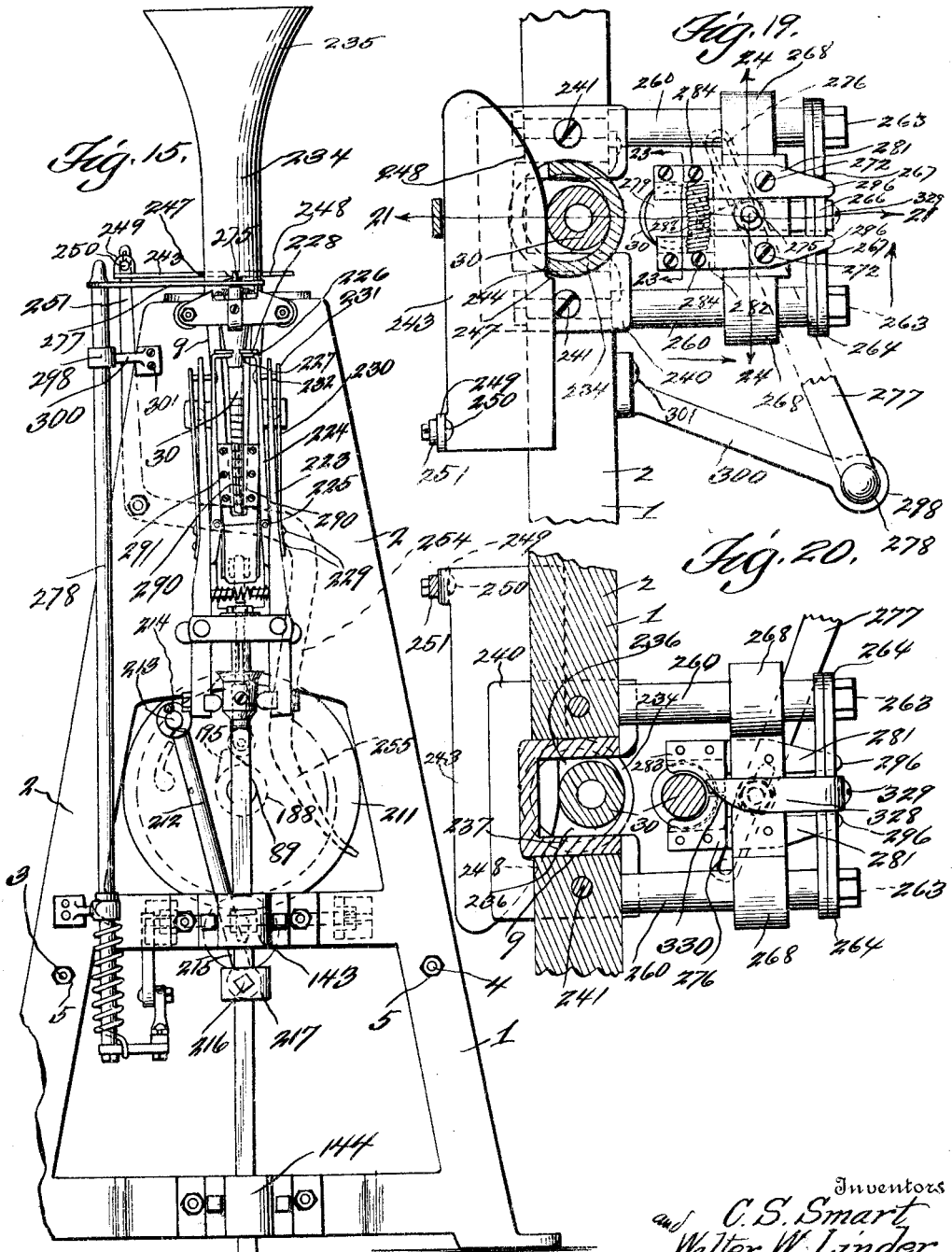

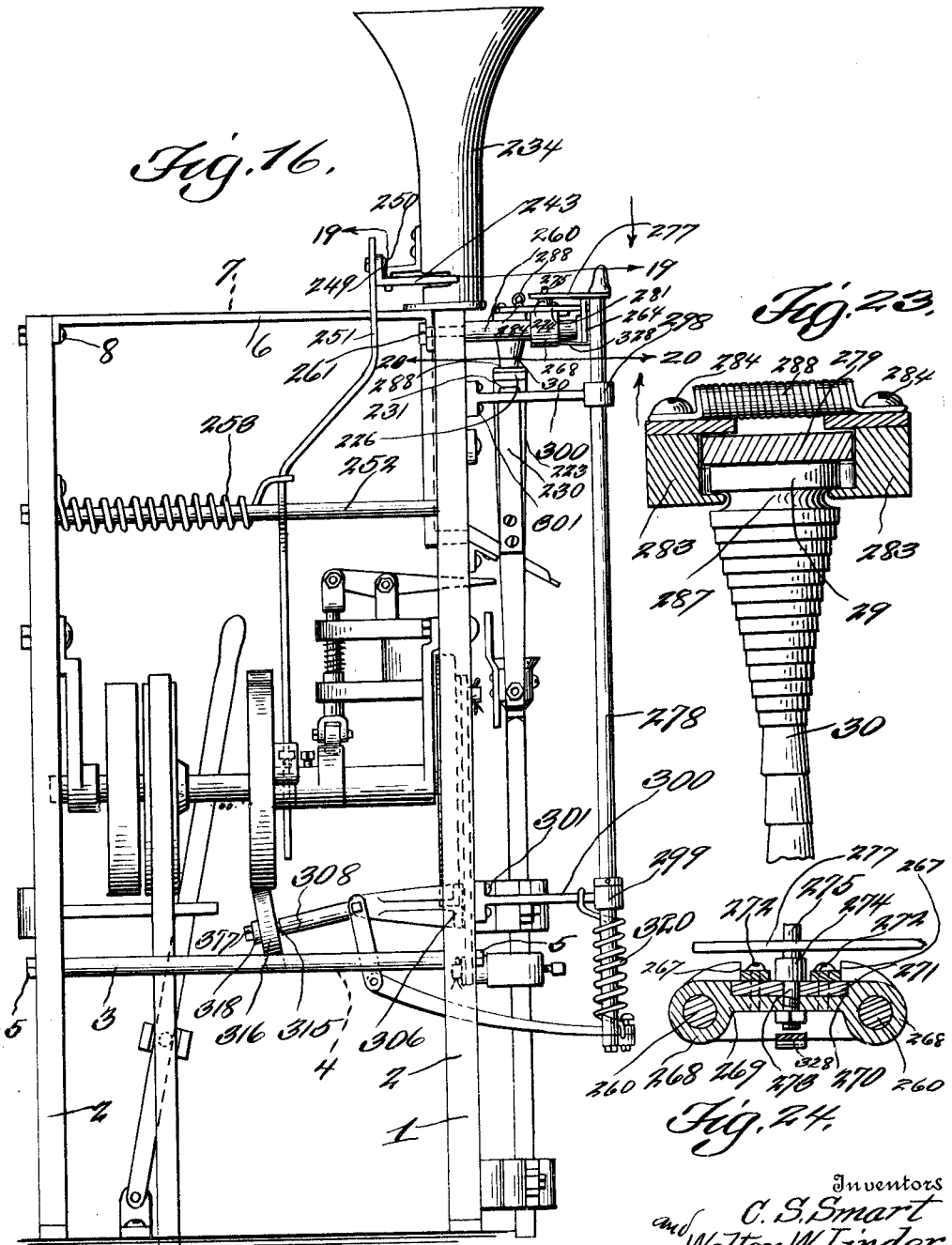

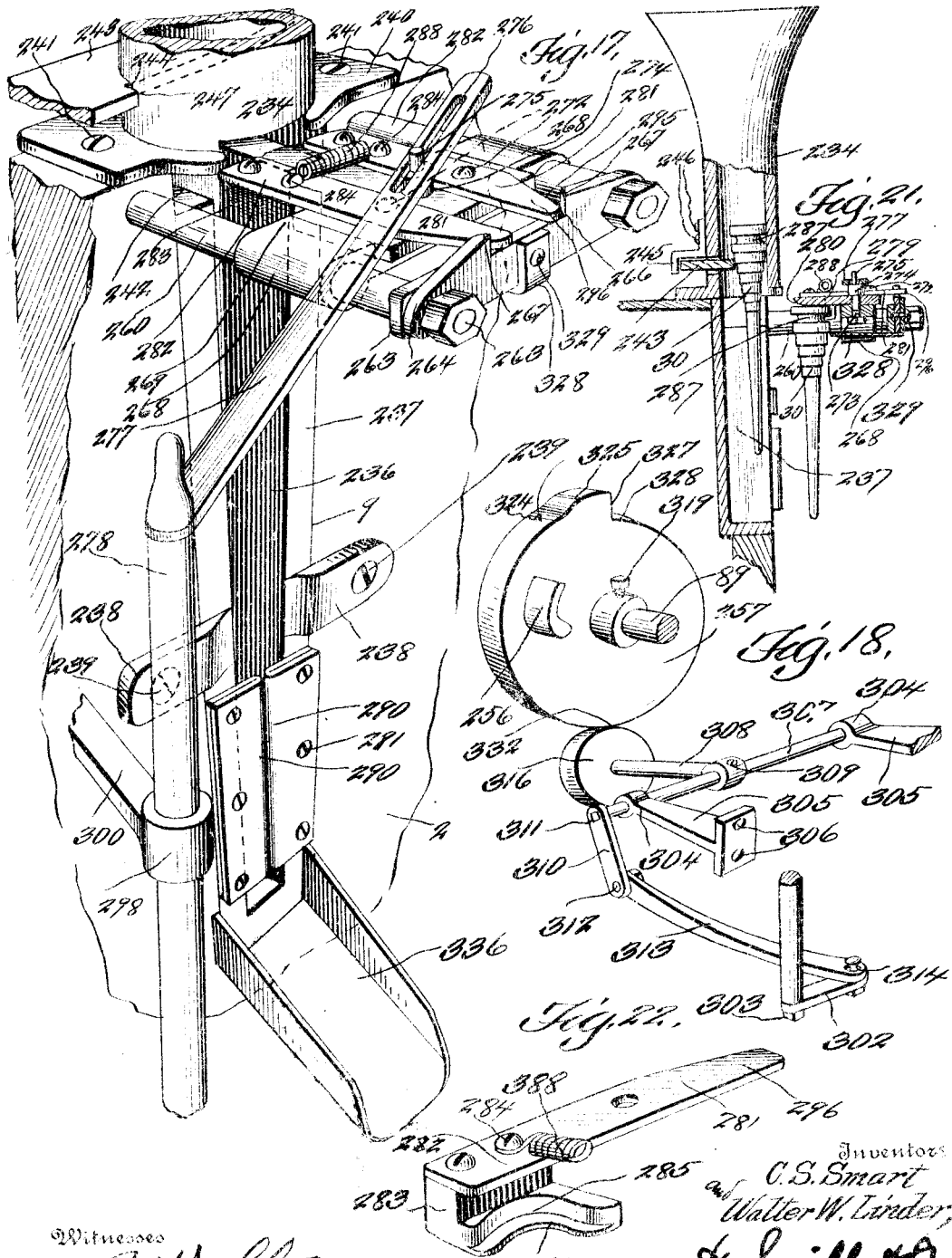

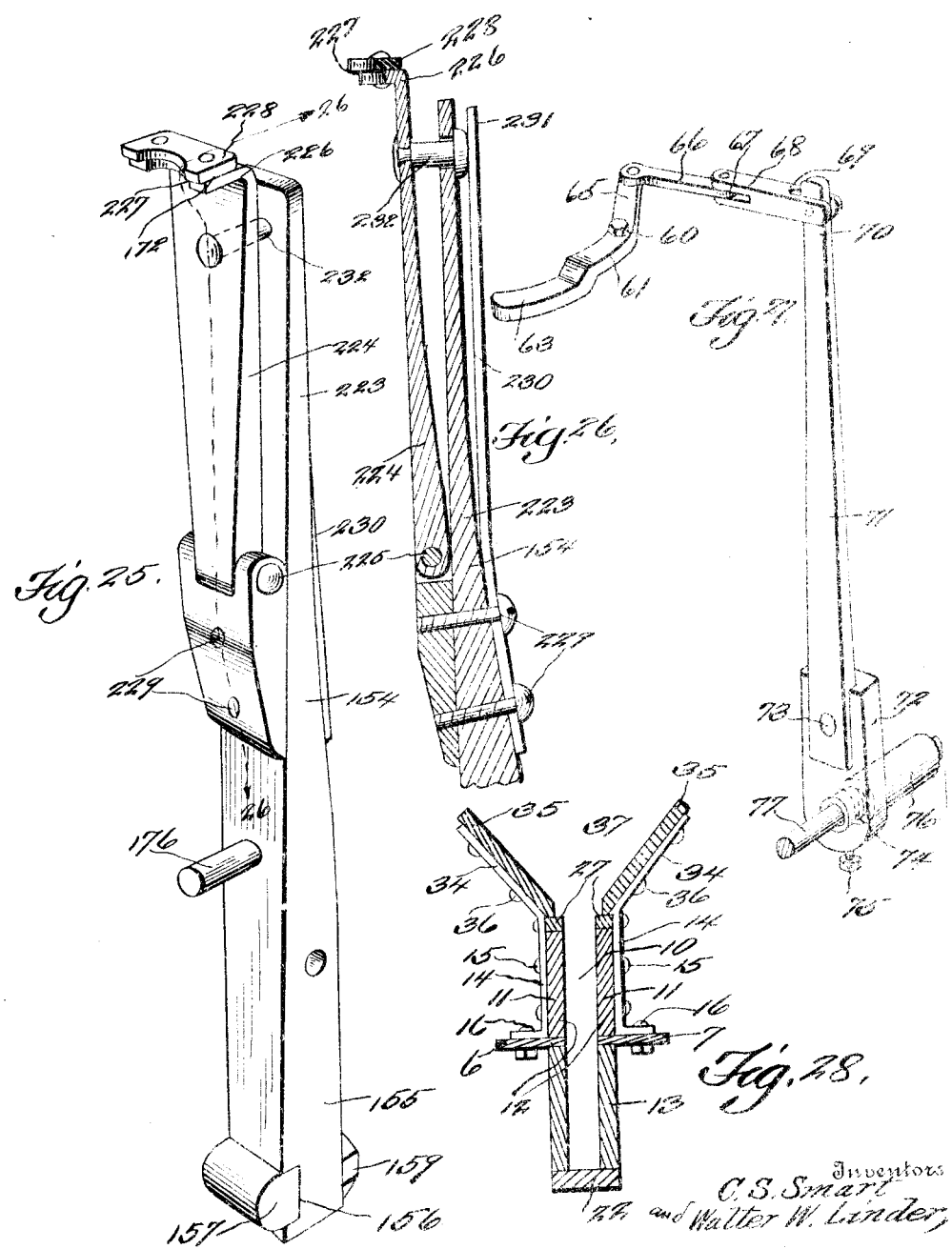

CHARLES S. SMART AND WALTER W. LINDER, OF COOLEEMEE, NORTH CAROLINA; SAID LINDER ASSIGNOR TO THEODORE V. TERRELL, OF COOLEEMEE, NORTH CAROLINA.

BOBBIN OR QUILL STRIPPING MACHINE.

1,144,006.

Specification of Letters Patent.

Patented June 22, 1915.

Application filed November 28, 1913. Serial No. 803,575.

*To all whom it may concern:*

Be it known that we, CHARLES S. SMART and WALTER W. LINDER, citizens of the United States, residing at Cooleemee, in the county of Davie and State of North Carolina, have invented a new and useful Bobbin or Quill Stripping Machine; and we do hereby declare the following to be a full, clear, and exact description of the invention, such as will enable others skilled in the art to which it appertains to make and use the same.

This invention relates to a new and useful improved bobbin or quill stripping machine.

As one of the objects of the invention, it is the aim to provide an improved machine for economizing expense of labor.

Another object of the invention is the provision of a machine for stripping the yarn from any form or construction of bobbin or quill, for instance such as "Draper feeler quills," "Draper cone quills," or "Crompton cone quills with shuttle spring grooves" and the like.

Another object of the invention is to provide a machine having means for holding or handling the quills from the same ends that are handled or held by the shuttle of a weaving machine or a spinning machine, thereby preventing the noses of the quills becoming injured or burred, which is a common occurrence with the machines now in use.

Another object of the invention is the provision of a machine of this nature, the operating parts of which are so timed, arranged and constructed, as to more accurately and efficiently coöperate coördinately in order to strip or remove the waste with greater rapidity, said operating parts having improved connections with a single driven shaft, which imparts movement to said parts.

One of the features of construction is the provision of a hopper throat having a discharge mouth including quill holding jaws at one end.

Another feature of construction is the provision of an intermittent feed mechanism for feeding the quills one at a time from the throat to the discharge mouth between the jaws thereof, in combination with means, whereby as each quill is fed between the mouth jaws, the remaining series of quills is checked or retarded.

Another feature of the invention is the provision of a quill discharging member, for discharging each quill immediately subsequently to being stripped from the jaws of the discharge mouth.

A further feature of the invention is the provision of a reciprocating device having spring tensioned stripping jaws for stripping the waste from the quill, said reciprocatory device being connected to a single driven member, which also operates means which in turn operates a member on the reciprocating device, which in turn throws the stripping ends of the stripping jaws together at a pre-determined period, in order to remove the waste from the quill, in a manner as would be accomplished by human hands.

In practical fields the general construction as well as the detail features thereof may be subjected to alterations, to which the patentees are entitled, provided the alterations fall within the scope of what is claimed.

The invention comprises further features and combination of parts, as hereinafter set forth, shown in the drawings and claimed.

In the drawings:—Figure 1 is an end view of the improved quill stripping machine constructed in accordance with the invention. Fig. 2 is a view in side elevation showing the stripping jaws in the act of moving downwardly to remove or strip the waste from a quill. Fig. 3 is a plan view. Fig. 4 is an enlarged plan view of one end of the stripping machine, showing the feed mechanism on an enlarged scale, for feeding the quills one at a time between the jaws of the discharge mouth, and also the checking or retarding mechanism, whereby the remaining quills are checked as each quill is fed to the discharge mouth, and also showing the discharge member for discharging the quill from the discharge mouth. Fig. 5 is a sectional view on line 5—5 of Fig. 4, showing a quill between the jaws of the discharge mouth, and also showing the stripping ends of the stripping jaws in the act of moving downwardly. Fig. 6 is a sectional view on line 6—6 of Fig. 5, showing a quill between the jaws of the discharge mouth. Fig. 7 is a detail view in perspective of one of the jaws of the discharge mouth. Fig. 8 is an enlarged vertical sectional view on line 8—8 of Fig. 1, also showing the stripping jaws in the act of moving downwardly to strip a quill. Fig. 9 is an enlarged sec-

[...] a view of a portion of the machine showing the mechanism operated by the single driven member, which mechanism at one end is active toward upper the reciprocating element. On the stripping jaws may be placed upon the quill. Fig. 10 is an enlarged detail elevation of the stripping jaws, the stripping ends of which are in the act of being closed upon a quill by the sliding device on the reciprocating element. Fig. 11 is a detail view in perspective of a portion of the reciprocating element and the sliding device, in the act of being actuated to close the stripping ends of the stripping jaws, by the mechanism actuated by the single driven member. Fig. 12 is an enlarged detail perspective view of the member for feeding each quill from the throat to the discharge mouth. Fig. 13 is a detail perspective view of the member for discharging each quill from the discharge mouth. Fig. 14 is a view in side elevation showing the opposite side of the machine to that shown in Fig. 2, illustrating parts in section. Fig. 15 is a view in end elevation showing a modified form or construction of quill stripping machine, whereby a different form of quill may be more efficiently stripped. Fig. 16 is a view in side elevation of the machine shown in Fig. 15 illustrating the stripping jaws in the act of moving downwardly. Fig. 17 is an enlarged view in perspective showing a fragmentary portion of the machine shown in Figs. 15 and 16, illustrating a different form of discharge mouth and jaws. Fig. 18 is a view in perspective showing the parts actuated by the single driven member for operating the jaws of the discharge mouth in Fig. 17. Fig. 19 is a sectional view on line 19—19 of Fig. 16, illustrating a quill in the throat, and a quill in the discharge mouth. Fig. 20 is a sectional view on line 20—20 of Fig. 16 showing the parts inverted to that shown in Fig. 19. Fig. 21 is a sectional view on line 21—21 of Fig. 19. Fig. 22 is a detail view in perspective of one of the jaws of the discharge mouth shown in Figs. 17, 19, 20 and 21. Fig. 23 is a sectional view on line 23—23 of Fig. 19, illustrating how the jaws of the discharge mouth of the modified structure hold a quill. Fig. 24 is a sectional view on line 24—24 of Fig. 19. Fig. 25 is an enlarged detail perspective view of one of the stripping jaws shown in Figs. 15 and 16. Fig. 26 is a sectional view on line 26—26 of Fig. 25. Fig. 27 is an enlarged detail view of the lever 61 and its connections with the sleeve 76. Fig. 28 is a sectional view on line 28—28 of Fig. 14.

*Frame of machine.*—The frame of the machine designated by the numeral 1, comprises the end standards 2, which are in the present instance in the form of castings, substantially triangular in contour. These skeleton standards are connected and reinforced relative to one another by the lower rods 3 and 4 secured in place by the nuts 5. The upper ends of the standards are connected and also braced by the elongated plates 6 and 7 secured in place by the bolts 8. The upper end portion of each standard is constructed with a vertical recess 9, partially V-shaped. The plates 6 and 7 are spaced apart as illustrated.

*Hopper and throat.*—Extending from standard to standard is a quill containing throat 10, each end of which is arranged in the recesses 9 of the standards. The rear portion of the throat or passage is substantially horizontally, while the forward portion is inclined downwardly.

The sides 11 of the throat comprise the upper and lower boards or plates 12 and 13. The upper boards or plates 12 are secured above the plates 6 and 7, while the boards 13 are arranged below. The boards 12 are secured in place by the straps 14, which in turn are secured by the screws 15, and the bolts and nuts 16 and 17, which hold the straps 14 to the plates 6 and 7. The lower boards 12 at their forward portions are secured in place by the straps 18, screws 19, and the bolts and nuts 20 and 21, the bolts 20 secure the straps 18 to the plates 6 and 7. The rear ends of the boards 12 are arranged to conform with the recess 9 of the rear standard, which recess 9 of the rear standard is partially wedge or V-shaped, which will prevent downward displacement of the boards 12 at the rear. The lower edge portions of the boards 12 are connected by the bottom boards or strips 22 and 23 secured in place by the screws 24. Secured upon the upper edges of the boards 13 by any suitable means such as screws 26 are metallic guide tracks 27, which are engaged by the rings 28 of the shuttle holding ends 29 of the quills 30. Owing to the rings of the quills being round in cross section, they will easily slide down the inclined portions 32 of the tracks to the discharge mouth of the throat. The straps 14 are constructed with extensions 34 inclined outwardly and secured to the boards 35 by means of the screws 36, as shown clearly in Figs. 1 and 2. The boards 35 constitute a hopper 37, in which the quills are deposited, and when thrown in the hopper, the tapered lower portions of the quills are suspended vertically in the throat, the rings of the shuttle holding ends of the quills engaging the guide tracks.

*Discharge mouth.*—The discharge mouth 33 is located between the opposite sides of the recess of the forward standard, and arranged in this discharge mouth is a pair of stationary jaws 39 and 40. Each jaw upon its inner face at its lower portion is constructed with a lip 41 extending the entire length of the jaw. The forward ends of the jaws upon their adjacent faces are provided with a series of lips 42, between which grooves 43 are constructed. These lips and grooves act as teeth, which are engaged by the rings 28 of the ends 29 of the quills 30, that is, when each quill is fed between the jaws. These jaws 39 and 40 are secured to the plate 45 by means of the bolts and screws 46 and 47. The screws 47 act as pivots for the jaws, while the bolts 46 pass through elongated openings 48 of the plate 45. By loosening the bolts 46 the forward ends of the jaws may be adjusted toward or away from one another, in order to arrange the jaws in their proper relative positions to receive the shuttle holding end of a quill. After the forward ends of the jaws have been adjusted in their proper positions, the bolts 46 may be tightened. The plate 45 is secured between the ends of the plates 6 and 7 of the frame and the upper end of the forward standards, by virtue of the said bolts 8. Secured upon the front face of the forward standard adjacent the recess and the discharge mouth are facing plates 50, which are held in place by the screws 51. The forward ends of the jaws 39 and 40 are constructed with horizontally arranged slots 52 and 53, through which the quill discharging member or blade 54 moves. The rear end of the jaw 40 is provided with a horizontally arranged slot 55, through which the quill feeding element or blade 56 moves, so as to feed the shuttle holding end of the quill from the discharge mouth 2 and between the forward adjacent faces of the jaws 39 and 40. Secured by means of a screw 57 to the plate 45 is a metal strip 58, which extends downwardly adjacent the rear edge of the plate 45 and terminates in a spring blade 59 disposed beneath the plate 45. The quills when being fed engage beneath and with the under face of the spring blades 59, in order to partially retard the quills in their movements through the discharge mouth. There are always two quills in the discharge mouth at one time, and when the feeding member or element 56 is operated, it contacts with the rear quill of the discharge mouth and pushes it forwardly, and which in turn contacts with the forward quill of the discharge mouth and pushes the same in engagement with the teeth of the jaws 39 and 40, and the quill previously in engagement with the teeth of the jaws 39 and 40 is discharged by the discharging member 54.

*Quill checking mechanism.*—Pivoted to the forward end of the plate 7 by means of a bolt 60 is a lever 61, the bolt 60 having a nut 62. The end 63 of the lever 61 is bent downwardly toward the plate 45, and is designed to move rearwardly over the rear quill in the rear end of the discharge mouth, so as to contact with the first quill in the forward end of the throat. The forward end of the throat terminates substantially at the dotted line *a—b* in Fig. 8, while the discharge mouth begins adjacent the right hand side of the dotted line *a—b*. In this manner it will be seen that the end portion 63 of the lever 61 will move over the rear quill in the rear end of the discharge mouth, so as to contact with the first quill in the forward end of the throat, thereby checking the remaining quills, which feed by gravity down the inclined portions of the tracks of the throat. Pivoted to the end portion 65 of the lever 61 is a link 66, which in turn is connected to the bifurcated end 67 of a second link 68, the opposite end of which is likewise bifurcated at 69 at right angles with the bifurcation 67. In the bifurcation 69 the upper end 70 of the lever 71 is pivoted. The lower end of the lever 71 is fixed to a short arm 72 by means of a screw 73, which arm 72 is in turn fixed by means of threads 74 and a set bolt 75 to a sleeve 76 mounted upon a shaft 77. When the sleeve 76 is rocked an oscillatory motion is imparted to the lever 71 and through the link connections 66 and 68 the lever 61 is oscillated to check the series of quills in the throat. One end of the shaft 77 is mounted in a suitable bearing 78 of the forward standards. The end 79 of said shaft is mounted in a suitable bearing 80 of the bracket 81. This bracket or bar 81 is secured by means of bolts 82 to the plate 7, while the lower end of the bracket or bar 81 is sleeved upon the reinforcing rod 4 of the frame of the machine, as shown at 83. Threaded to the end 84 of the sleeve 76 and secured against movement by a set screw 85 is an arm 86 having a foot 87. This foot rides upon the cylindrical surface of the collar 88, which is secured to the driven shaft 89. Located at a suitable place upon the circumference of the collar is a cam projection 90. As the shaft 89 is driven in the direction of the arrow 91, the collar 88 (which is secured to the shaft by the set bolts 92) likewise rotates, and when the cam projection 90 engages the foot 87, the arm 86 is raised, which in turn rocks the sleeve 76, thereby oscillating the lever 71, which in turn actuates the quill checking member. It will be seen that the sleeve 76 rocks independently of the shaft 77 on which it is mounted, the collar 94 (which is secured to the shaft 77 by the set screw 95) holds the sleeve in its proper location.

*Quill feeding mechanism.*—Secured to the forward standard by means of the bolts 96 and nuts 97 is a bracket 98. In a bearing 99 of the bracket and a bearing 100 of the standard a stub shaft 101 is mounted, secured in place by the set bolt 102. Sleeved upon the stub shaft 101 is a sleeve 103 having an arm 104 extending substantially upwardly at one end, and a second arm 105 at the other end extending substantially horizontally. Bolted or otherwise secured at 106 to the arm 104 is a lever 107, to the lower portion of which by means of a bolt 108 a second lever 109 is pivoted, there being a suitable nut 110 for securing the bolt 108 in place. The two levers 107 and 109 lie parallel to one another and in contact, and as a rule they move together as one body. This is accomplished owing to the fact that the lever 107, is provided with an arm 110 having a shoulder 111, with which the lever 109 contacts, there being suitable springs 112 connecting the angled end 113 of the arm 110 and the lever 109, acting to hold the lever 109 in contact with the shoulder 111. The upper end of the lever 109 is pivoted at 114 in the slotted or bifurcated end 115 of the feeding member or element 56. It will be noted, however, as the element 56 is operated transversely of the mouth, the lever 109 will yield against the action of the springs 112, in case the feeding member 56 should bind when contacting with a quill. Bolted or otherwise secured to the arm 105 as at 116 is an extension arm 117, the end portion 118 of which rides against the collar 119, which is secured to the driven shaft 89 by the set bolt 120. The collar 119 is provided with a cam projection 121, which when contacting with the portion 118 of the extension arm 117 will oscillate the same downwardly, thereby rocking the sleeve 103, which in turn will oscillate the levers 107 and 109, so as to actuate the feeding member 56.

*Quill discharging mechanism.*—Upon the end 122 of the shaft 77 an arm 123 is secured by virtue of the nut 124. Secured also by the nut 124 and the bolt 125 to the arm 123 is a lever 126, which in turn is pivoted at 127 to the bar 128. This bar slides upon the upper faces of the jaws 39 and 40 and in contact with the under faces of the brackets 129, which are secured to the plate 45 by the bolts 130. These brackets 127 extend downwardly in front of the bar 128, so as to prevent upwardly movement or displacement of the same. To the bar 128 the discharging member 54 is secured in any suitable manner or formed as an integral part thereof. This discharging element or member 54 is constructed with an inclined edge 131, which contacts with the central ring of the shuttle handling end of the quill, when reciprocated through the slots or recesses 52 and 53, in order to discharge the quill subsequently to being stripped of the waste. The bar 128 not only carries the discharging member 54, but also is supplied with a downwardly extending lip 132, which checks the quill as it is fed in engagement with the acting teeth of the jaws 39 and 40, that is, prior to the movement of the discharging member. In other words, the lip 132 acts as a closure to the jaws of the discharge mouth. One edge of this lip 132 is beveled off as shown at 133, in order that the quill may be discharged from between the jaws freely and without binding. It will be observed that as the bar 128 is moved in the direction of the arrow 134, the lip 132 and the discharging element 54 are moved synchronously, thereby opening the outlet end of the discharge mouth between the jaws, and discharging the quill, after the same is stripped. Secured by a set screw 135 to the shaft 77 is an arm 136 having a foot 137, which rides in contact with the circumference of the larger flange 138 of the collar 88, and as the cam projection 139 comes in contact with the foot 137, the arm 136 is raised, thereby rocking the shaft 77 independently of the sleeve 76, which shaft 77 will in turn oscillate the lever 126, thereby reciprocating the bar 128, and with it the discharge member 54. A spring 140 is connected at one end as at 141 to the arm 136, while the other end is connected at 142 to the bar 81. This spring 140 acts to draw the arm 136 downwardly in contact with the larger flange of the collar 88, after passing the cam projection 139, thereby returning the discharge member or element 54 to its initial position, through the medium of the shaft 77 and the lever 126.

*The quill stripping mechanism.*—The front standard of the frame of the machine is provided with bearings 143 and 144, in which a vertically reciprocating bar 145 is mounted. This bar 145 from the shoulder 146 to its lower extremity, is rectangular in cross section, so as not to rotate in the bearings 143 and 144. However, above the shoulder 146 the bar is cylindrical and designated by the numeral 147. Upon the end of the cylindrical part 147 a threaded extension 148 is provided, extending through the cross head 149, there being a nut and washer 150 and 151 to secure the cross head in place. The opposite ends of the cross head are provided with bifurcations 152, as shown clearly in Fig. 11. Mounted pivotally in the bifurcations 152 upon the pivot pins 153 are the stripping jaws 154. The lower short arms 155 of the jaws 154 are constructed with recesses 156 for the reception of the buffer members 157, upon the extensions 158 of which the nuts 159 are threaded, to hold the buffer members in place. As shown clearly in the drawings, particularly Figs. 1 and 11, the adjacent faces of the buffer members are semi-cylindrical, and when the reciprocating bar 145 is upon its upward movement these semi-cylindrical surfaces are normally in contact with the cylindrical portion 147, and remains in such contact for substantially the full movement of the bar 145. This cylindrical portion 147 of the bar 145 is constructed with an elongated groove 160, to receive the end of the screw 161 of the sleeved collar 162, thereby slidably mounting the same. Secured by suitable screws 163 to the collar 162 is a member 164, the lower short arm 165 of which projects beyond the lower end of the collar 162, while the upper long arm 166 projects beyond the cross head 149 slightly, the purpose of which arms 165 and 166 will appear presently. As the reciprocating bar 145 reaches the end or completion of its full movement, the collar 162 is forced downwardly between the semi-cylindrical surfaces of the buffer members 167, by reason of the long arm 166 contacting with the long arm 168 of the lever 169, the screw 151 preventing the collar against rotation.

The lower beveled end of the collar designated by the numeral 170 easily passes between the buffer members. As the collar 162 passes between the buffer members, the lower short arms 155 of the stripping jaws spread apart against the action of the springs 171, thereby throwing the stripping ends 172 of the jaws 154 toward one another. These stripping ends are angular and directed toward each other having semi-circular recesses 173. The stripping ends when brought together act to remove the waste from the quill or bobbin, the recesses 173 forming a substantially circular opening, in which the shank of the quill is received. It will be observed that the walls of the recesses 173 are beveled as shown at 174, thereby affording a rounded edge 175 to contact with the waste upon the bobbin. As the waste is removed in a manner as would be accomplished by human hands, the rounded edges 175 will not scar or injure the cylindrical surface of the quill. The spring 171 is mounted upon the studs 176. Fastened by suitable bolts and nuts 177 to the forward standard is a bracket plate 178, having a bearing 179 for one end of the driven shaft 89. Projecting laterally from the plate 178 is a pair of spaced apart bracket arms 180 and 181, slidably mounted in which are the enlarged and reduced portions 182 and 183 of the rod 184, the portion 182 being mounted in the arm 181, while the part 183 moves in the arm 180. The lower end of the portion 182 is constructed with a fork 185, in which a roller 186 is mounted upon a pin 187. This roller 186 rolls in contact with the collar 188, which is secured by the set bolt 189 to the driven shaft 89. The upper end of the reduced portion 183 of the rod 184 is provided with a fork 190, between the forked ends of which upon the pin 191, the short arm 192 of the lever 169 is pivoted, which rocking lever 169 is pivotally mounted upon the pin or bolt 193 of the U-shaped bracket 194 carried by the bracket arm 180. As the driven shaft 89 rotates the cam projection 195 will contact with the roller 186 so as to reciprocate the rod 184 vertically against the action of the spring 196, just at a moment when the reciprocating bar 145 approaches the end of its vertical movement, thereby throwing the long arm 168 of the lever 169 downwardly, in order to contact with the long arm 166 of the member 164, thereby in this manner causing the collar 162 to move downwardly upon the cylindrical portion 147 of the bar 145, as said bar 145 is in the act of completing its full movement upwardly, and when this collar 162 is thus operated, the lower short ends of the stripping jaws are forced apart, while the stripping ends are forced together, in such wise as to remove the waste yarn or other material from the quill or bobbin. The driven shaft has its end 197 mounted in a suitable bearing 198 of the bracket 199, bolted or otherwise secured at 200 to the rear standard of the frame of the machine, and upon this driven shaft 89 fast and loose pulleys 201 and 202 are carried. A belt 203 driven by any suitable means (not shown) coöperates with one or another of the pulleys 101 and 102, there being a lever 204 pivoted at 205 and having a U-shaped device 206, for shifting the belt from the loose to the fast pulley, as shown clearly in Fig. 2. A guide bracket 207 has suitable notches 208 for holding the lever in different positions. Mounted upon the end 209 of the driven shaft, so as to rotate therewith by means of the key 210 is a disk wheel 211, to which a pitman bar 212 is eccentrically pivoted upon a stud pin 213, held in place by a cotter pin 214. The other end 215 of the pitman bar is pivoted to a stud 216 of a collar 217, fixed by a set bolt 218 upon the bar 145. Thus it will be seen by virtue of the pitman bar connected to the disk wheel 211, the vertically reciprocating bar 145 will be operated, so as to move the stripping jaws in a manner desired. When the bar 145 is upon its downward movement, as will be understood from Figs. 1, 2 and 8, it will be observed that just as the bar is about to complete its downward movement the lower short arm 165 of the member 164 will contact with the bearing 143, and as the bar 145 starts to move upwardly, the same will slide through the collar 162, which has been limited in its downward movement by the bearing 143, independently of the downward movement of the bar 145. In this manner the collar 162 will be moved from between the semi-cylindrical surfaces of the buffer members 157, thereby permitting the springs 171 to throw the stripping ends of the jaws 154 open, just as the stripping ends reach the lower end of a quill, immediately after which the quill will be discharged by the discharging element 54.

The stripping jaws may be constructed as shown in Fig. 15. In other words, each jaw may consist of two sections, the body section and a quill stripping section, which quill stripping section is pivotally and yieldably mounted upon the body section, and adapted for stripping or removing the waste from a Draper cone quill. However, the pivotally yieldable stripping section will also strip the form of quill shown in Figs. 1, 2, 3 and 8, or any other form of quill. The extension arm 117 is held in contact with the collar 119 and the cam 121 by the spring 117$^a$ mounted upon the stub 117$^b$ of the bracket arm 117$^c$. This spring also throws the feeding device 56 back to its initial position. The quill checking lever 61 when in its initial position contacts with the screw 57, limiting the same in such position.

*Operation.*—In the operation of the improved machine, the quills are deposited in the hopper, the shanks hanging vertically in the throat, the rings of the shuttle holding ends of the quills engaging the tracks, by their own gravitation the quill slides down the inclined portions of the tracks, toward and in the mouth, and the pressure and weight of one quill against the other, as shown in Fig. 2 tends to keep the mouth well fed. Power is transmitted to the revoluble shaft 89 by means of the belt 203 connected to any suitable source of power, and upon first starting, the lower short arms 155 of the stripping jaws are down adjacent the bearing 143, and the stripping ends 172 of the jaws are spread apart, there being a quill in the teeth of the jaws 39 and 40. As the revoluble shaft 89 starts revolving or rotating in the direction of the arrow 91 in Fig. 14, a vertical reciprocatory movement is imparted to the bar 145, the stripping jaws moving with the same vertically. As the bar 145 approaches the end of its upward movement, the collar 162 is forced downwardly between the buffer members 157, by means of the lever 169 contacting with the long arm 166 of the member 164, which lever 169 is actuated by the cam 195 on the shaft 89. In this manner the stripping ends of the jaws are closed upon the quill between the teeth of the jaws 39 and 40, against the action of the spring 171. However, just before the bar 145 starts to move upwardly, a quill which has been previously stripped, is discharged from between the teeth by the discharging member 54, owing to the cam 139 actuating the arm 136 which rocks the shaft 77, which in turn oscillates the lever 126. As soon as the foot 137 of the arms 136 passes the cam 139 the discharging member 54 is returned to its initial position by the spring 140 instantly, thereby leaving the teeth free to receive another quill. Just so soon as the discharging member 54 is restored to its initial position, the quill checking lever 61 is actuated, to check the gravity feed of the series of quills upon the inclined portions of the tracks. When this checking or retarding operation is being performed, the stripping ends of the jaws have reached a position substantially midway between their initial positions, and their positions adjacent the jaws 39 and 40. As the jaws, that is, the stripping ends thereof, are approaching the end of their upward movement, the checking member is released and restored to its initial position, but the jaws have not begun to close. However, before the checking member is released and restored to its initial position the feeding element 56 proceeds to operate transversely of the rear end of the mouth 33, in order to separate the checked quills and the two quills in the mouth, the inclined edge 220 of the feeding element acting to force the two quills in the mouth forwardly, the forward quill of such two quills being forced between the teeth and the jaws 39 and 40, just prior to the closing of the stripping ends of the jaws, and after the quill has been pushed between the teeth, the jaws then close by the action of the collar 162, and at the same time the jaws are closing, the feeding element 56 is returned to its initial position, thereby allowing the weight of the quills in the throat to keep the mouth well fed. After the jaw is closed, which is accomplished by the collar 162, the bar 145 and the jaws as well as the collar 162 all move downwardly as one body, the stripping ends of the jaws removing the waste yarn from the quill.

As before stated, just prior to the bar 145 reaching the limit or end of its downward movement, say for instance, about an inch in practice, the short arm 165 of the member 164 contacts with the bearing 143, thereby stopping the movement of the collar 162, that is, with the bar 145, allowing the bar 145 to pass through the collar, in this manner the collar is removed from between the buffer members 157, as the bar 145 completes this further movement of an inch, thereby permitting the jaws to instantly open, and as soon as the jaws are opened the discharging element 54 discharges the stripped quill from between the teeth of the jaws 39 and 40, the discharged quill falling in any suitable receptacle (not shown) adapted to be arranged forward of the machine, while the stripped waste slides down the chute 221, and then into another receptacle (not shown), but which is adapted to be disposed between the first receptacle and the forward end of the machine. This cycle of operation is constantly repeated as the revoluble shaft 89 is operated. The discharging element operates intermittently, the feeding element and the checking element are likewise intermittently operated, while the bar 145 is continuously reciprocating. However, the checking, feeding and discharging elements operate alternately with one another, but all of said parts and the bar 35 and the stripping jaws operate coördinately.

Modified form.

The modified form of the invention comprises practically the same conventional form of frame, as well as the same form of mechanism for operating the stripping jaw, all of which parts are designated by the same character heretofore used. However, in this form of the invention the stripping jaws are differently constructed. For instance, each jaw comprises a body part 223 and a stripping section 224, the stripping section 224 being pivoted to the bottom part at 225. Each stripping section is provided with the stripping ends 226 extending toward one another having the usual semi-circular recesses 227 similar to those shown in Fig. 1 as well as Fig. 8. The stripping ends 226 are provided with wipers 228 constructed of any suitable material such as rubber or the like, acting to more thoroughly wipe or strip the waste from the quill, which may be a "Draper feeler quill," or a "Draper cone quill," or a "Crompton cone quill with a shuttle spring groove." Secured at 229 to the body section is a leaf spring 230, the free end 231 of which bears against a stud 232 of the quill stripping section 224. This stud 232 passes through the upper end of the body section 223. By this construction the stripping sections are yieldable.

*Hopper throat.*—In this form of the machine the hopper throat comprises a tube 234 vertically arranged having a hopper 235, the throat being alined with the pocket 236. This pocket 236 comprises a gradual tapering casting U-shaped in cross section conforming to and fitting the recess 9 of the forward standard, and open in the front. This tapering casting 237 is provided with lateral extending ears 238 receiving screws 239, which pass into the standard, to secure the casting 237 in place. This casting with its pocket receives the quill as it leaves the throat. The lower end of the tube which forms the quill throat is constructed with a base plate 240, secured to the forward standard by the screws 241, thereby holding the tube in a vertical position. However, between the tube and the upper ends of the sides of the pocket spaces 242 are provided, the purpose of which will appear later.

*Quill checking mechanism.*—A quill checking member 243 is adapted to operate transversely of the slot 244 extending transversely and partially through the tube 234. This checking member 243 is guided through the slot 244 by means of the angular arm 245, secured at 246 to the tube 234. A shoulder 247 is formed upon the checking member adapted to contact with the tube to limit the movement of the checking member. The checking member at one end has one of its edges beveled or curved off as shown at 248, so that as the checking member is withdrawn from the slot, the quill is released, so as to drop into the pocket. The other end of the checking member is provided with an ear 249, to which is pivoted at 250 one end of the lever 251, which lever in turn is pivoted upon the rod 252, and under tension of the spring 253, which surrounds the rod 252. The lower portion of the lever is angular, and designated by the numeral 254 having a foot 255, adapted to ride against the lateral projection 256 of the cam 257. As the projection 256 engages the foot 255, the lever 251 is rocked, thereby withdrawing the checking element 243 from the slot 244. The cam 257 is carried by and rotatable with the revoluble driven member or shaft 89.

A pair of spaced apart guide rods 260 projects forwardly from the upper end of the forward standard, being secured in place by the nuts 261. The outer ends of the guide rods 260 are provided with a reduced portion 263 extending through the plates 264 and 265. The plate 264 is provided with a recess 266, the end walls of which are beveled as shown at 267. Mounted upon the guide rods are the sleeves 268 of the cross heads 269, in a recess 270 of which a plate 271 is not only secured by the screws 272, but also by the bolt 273. Projecting upwardly from the bolt 273 from the enlargement 274 thereof is a stud 275, which enters a slot 276 of the lever 277, which is fixed to rock with the vertical shaft 278. As the shaft 278 is rocked, the cross head is moved toward and away from the forward standard. The plate 271 is constructed with an extension 279, the end of which adjacent the under surface is provided with a bevel 280. Pivoted by the screws 272 upon the plate 271 are levers 281, the long arms 282 of which have secured thereto the quill holding jaws 283, by means of the screws 284. These jaws are constructed with recesses 285, to receive the shuttle holding end of the quill, the lips 286 acting as teeth extend into the groove 287 of the cone quill. This groove in commercial fields is entitled "a shuttle spring groove." A spring 288 connecting two of the screws 284 holds the jaws 283 adjacent to and in contact with the extension 279. When the cross head 269 is moved toward the forward standard the jaws 283 enter the spaces 242, between the base 240 of the tube and the upper end of the sides of the pocket 236. When said jaws 283 enter these spaces, they grip the shuttle handling end of the quill, the lip 286 entering said shuttle spring groove. When a cross head is moved away from the forward standard, the quill is removed from the pocket, the lower end of the quill being pulled by the flexible fiber lips 290, which are secured at 291 to the lower portion of the pocket. The quill is removed from the pocket a short period just before the stripping ends 226 of the stripping sections reach the limit or end of their upward movement, and in the position, so that the stripping jaws will close upon the quill. After the quill is removed from the pocket the cross head 269 remains in the position as shown in Figs. 17 and 21 for a short period, that is, while the stripping jaws are moving downwardly to strip the waste from the quill. It will be observed that while the cross head is in this position, the extreme beveled edge portions 295 of the short arms 296 of the levers 281 are in engagement with the end bevels 267 of the recess 266. After the stripping jaws have completed their downward movement, removing the waste from the quill, the cross head is moved farther away from the forward standards, and by virtue of the coöperation between the beveled ends 267 and the beveled edges 295 of the arms 296, the jaws 283 are thrown open, thereby releasing the quill, which drops by gravity into any suitable receptacle (not shown).

The rocking rod 278 is mounted in bearings 298 and 299 of the arms 300 secured at 301 to the forward standard. To the lower end of the rocking rod 278 an arm 302 is fixed by the nut 303 to move therewith. Mounted in bearings 304 of the bracket arms 305, secured at 306 to the forward standard is a rock shaft 307, with which the arm 308 is fixed at 309. An additional arm 310 is fixed at 311 to one end of the rock shaft 307. Pivotally connected at 312 to the arm 310 is a link 313, which in turn has a loose connection 314 to the arm 302. Free to rotate upon the reduced end 315 of the arm 308 is a roller 316, there being a nut and washer 317 and 318 for holding the roller revolubly on the reduced end 315. This roller 316 contacts with the periphery of the cam 257, which is secured or fastened to rotate with the shaft 89 by means of the set bolt 319. A spring 320 surrounds the lower end of the rocking rod 278 between the bearing 299 and the arm 302. One end of this spring engages one of the arms 300, while the other end engages the arm 302, which is movable with the rod 278, while the arm 300 is stationary. It will be observed that the action of this spring 320 rocks the rod 278 in order that the cross head will be thrown toward the forward standard, so that the jaws 283 will enter said spaces 242. The construction and the mode of operation of the stripping jaws may be fully understood from the foregoing operation of the construction of machine shown in Figs. 1 to 14 inclusive, therefore there is no necessity of repeating.

Assuming a quill has been stripped, in which case the cross head is in a position as shown in Figs. 17 and 21, and the roller 316 will then be in engagement with the cam 257 at the point indicated by the arrow 324. The revoluble shaft 89 being still in motion, the roller 16 will ride the cam projection 325, thereby further rocking the shaft 307, which in turn will rock the rod 278 through the medium of the arms 302 and 310 and the link 313. Upon this further movement of the rod 278, the lever 277 will throw the cross head from the position shown at 17, toward and in contact with the plate 263, and while the cross head 269 is making this further movement, the jaws 283 will be thrown open by the coöperation of the beveled ends 267 of the recess 266 and the inclined edges 295, thereby releasing the quill. Just so soon as the roller passes off the abrupt shoulder 327 of the cam projection and in contact with the part 328 of the cam 257, the spring 320 will throw the cross head toward the forward standard, the jaws 283 entering the spaces 242, thereby gripping another quill instantly. However, when the jaws 283 are manipulated to release the quill, the tongue 328 secured to the plate 264 by the screw 329 will assist in throwing the quill or discharging the same from between the jaw, by the inclined or curved off edge 330, coming in contact with the shuttle handling end of the quill.

After a quill has been gripped by the jaws 283, the quill having been released by the checking member 243 prior to the jaws 283 entering the spaces 242, the bar 145 starts upon its upward movement, and at the same time the rod 278 begins to rock, owing to the roller riding the cam from the part 328 to the point indicated at 332 in Fig. 18. However, the quill is drawn from the pocket to a position shown in Fig. 21 just about the instant the stripping jaws start to close, the bar 145 not quite having reached the limit of its upward movement. While the jaws are stripping or removing the yarn from the quill, the roller 316 travels the cam from the point 332 to the point 324, the periphery of the cam between such points being concentric with the center of the cam, then as the roller 316 engages the cam projection 325 to open the jaws 283, on the further movement of the cross head from the position shown in Fig. 17 toward the plate 263, the stripping jaws are being opened, in a manner previously set forth. The periphery between the points 332 and 318 is eccentric with the center of the cam 357, consequently the shaft 307 and the rod 278 are rocked. When a quill is released from the jaws 283 it falls in any suitable receptacle (not shown), while the stripped yarn slides down the trough 336 and into any suitable receptacle (not shown).

From the foregoing it will be observed there has been produced a novel and efficient quill stripping machine, and one which has been found practical and desirable in many ways.

The invention having been set forth, what is claimed as new and useful is:—

1. In a quill stripping machine, a pair of quill holding jaws, a reciprocating element having stripping jaws movable therewith, a member movable independently on said element for closing said jaws, and a revoluble device for reciprocating said element, and means actuated by said device to actuate said member at a pre-determined moment in a reverse direction to the movement of the element to close the jaws.

2. In a quill stripping machine, a reciprocating element having stripping jaws movable therewith, a member movable independently on said element for closing said jaws, and a revoluble device for reciprocating said element, and means actuated by said device to actuate said member at a pre-determined moment in a reverse direction to the movement of the element to close the jaws, and means for returning said member to its initial position, whereby said jaws may open.

3. In a quill stripping machine, a reciprocating element having stripping jaws movable therewith, a member movable independently on said element for closing said jaws, and a revoluble device for reciprocating said element, and means actuated by said device to actuate said member at a pre-determined moment in a reverse direction to the movement of the element to close the jaws, and means for returning said member to its initial position, whereby said jaws may open, and spring means for throwing the stripping jaws open.

4. In a quill stripping machine, a reciprocating element having a cross head provided with stripping jaws, spring tensioned means between said jaws, and a member slidable on said element to close said jaws against the spring means, means for actuating said member independently of the element to close the jaws.

5. In a quill stripping machine, an element having a pair of stripping jaws provided with heel buffers, means for reciprocating said element, a member slidable on the element adapted to be forced between the heel buffers independent of the movement of the element to close the stripping jaws.

6. In a quill stripping machine, an element having a pair of stripping jaws provided with heel buffers, means for reciprocating said element, a member slidable on the element adapted to be forced between the heel buffers to close the stripping jaws, and a mechanism actuated by said means for forcing the member between the heel buffers.

7. In a quill stripping machine, an element having a pair of stripping jaws provided with heel buffers, means for reciprocating said element, a member slidable on the element adapted to be forced between the heel buffers to close the stripping jaws, and a mechanism actuated by said means for forcing the member between the heel buffers, and means to be contacted with by a part of said member to withdraw the member from between the buffers.

8. In a quill stripping machine, a reciprocating element having a pair of stripping jaws provided with heel buffers, and a member slidable on the element to force the heel buffers apart to close the jaws, means placed under tension by the closing of said jaws for opening the same when the member is removed from between the buffers, and means for removing the member from between the buffers.

9. In a quill stripping machine, a reciprocating element having a pair of pivoted stripping jaws provided with heel buffers, means for reciprocating said element, a member slidable on the element adapted to be forced between the buffers to close the jaws, a mechanism actuated by said means a little before the element reaches the limit of its upward movement to force the member between the heel buffers, means placed under tension when the buffers are forced apart and the jaws closed, for opening the jaws when the member is removed from between the buffers, said member having a device, and means contacted with my said device just before the element reaches the limit of its downward movement to remove the member from between the buffers, to allow the tension means to open the jaws.

10. In a quill stripping machine, an element having a pair of stripping jaws provided with heel buffers, means for reciprocating said element, a member slidable on the element adapted to be forced between the heel buffers to close the stripping jaws, a mechanism actuated by said means for forcing the member between the heel buffers, a device to be contacted with by a part of said member to withdraw the member from between the buffers.

11. In a quill stripping machine, an element having a pair of stripping jaws provided with heel buffers, means for reciprocating said element, a member slidable on the element adapted to be forced between the heel buffers to close the stripping jaws, a mechanism including an oscillatory device and actuated by said means for forcing the member between the heel buffers, a device to be contacted with by a part of said member to withdraw the member from between the buffers, said reciprocating means having operative connections with said mechanism for throwing the oscillatory device in the path of a part of said member.

12. In a quill stripping machine, an element having a pair of stripping jaws, means for reciprocating said element, a member slidable on the element adapted to be forced between the jaws to close the same, and a device having connections with said means and actuated thereby for throwing the device in the path of a part of the member to force the member between said jaws.

13. In a quill stripping machine, an element having a pair of stripping jaws, means for reciprocating said element, a member slidable on the element adapted to be forced between the jaws to close the same, and a device having spring tensioned connections with said means and actuated thereby for throwing the device in the path of a part of the member to force the member between said jaws.

14. In a quill stripping machine, an element having a pair of stripping jaws, means for reciprocating said element, a member slidable on the element adapted to be forced between the jaws to close the same, and a device having spring tensioned connections with said means and actuated thereby for throwing the device in the path of a part of the member to force the member between said jaws, and a stationary device to be contacted with by a part of said member to withdraw the member from between the jaws to permit them to open.

15. In a quill stripping machine, an element having a pair of stripping jaws, means for reciprocating said element, a member slidable on the element, said reciprocating means including a shaft having a cam, a pivoted device having spring-tensioned means, adapted to intermittently engage the cam for throwing the pivoted device in the path of a part of said member to force the member between the jaws to close the same.

16. In a quill stripping machine, an element having a pair of stripping jaws, means for reciprocating said element, a member slidable on the element, said reciprocating means including a shaft having a cam, a pivoted device having spring-tensioned means, adapted to intermittently engage the cam for throwing the pivoted device in the path of a part of said member to force the member between the jaws to close the same, and means to be contacted with by a part of said member to withdraw the member from between the jaws.

17. In a quill stripping machine, a quill containing throat having a discharge mouth, a mechanism for intermittently feeding the quills from the throat to the mouth, a quill checking mechanism, a quill discharging mechanism including a member for opening the mouth, an element having a pair of stripping jaws, means for reciprocating said element, and to which reciprocating means each of said mechanisms have independent operative connections, whereby the mechanisms are coördinately operated at predetermined moments, said element including a member, and a mechanism including a device operated by said reciprocating means to be thrown in the path of the member to force the same between said jaws to close the jaws.

18. In a quill stripping machine, a quill containing throat having a discharge mouth, a mechanism for intermittently feeding the quills from the throat to the mouth, a quill checking mechanism, a quill discharging mechanism including a member for opening the mouth, an element having a pair of stripping jaws means for reciprocating said element, and to which reciprocating means each of said mechanisms have independent operative connections, whereby the mechanisms are coördinately operated at predetermined moments, said element including a member, and a mechanism including a device operated by said reciprocating means to be thrown in the path of the member to force the same between said jaws to close the jaws, and means to be contacted with by a part of said member to withdraw the same from between the jaws.

19. In a quill stripping machine, a quill containing throat having a discharge mouth, a mechanism including stripping jaws for stripping each quill, means for reciprocating said mechanism and including a cam, a rocking lever actuated by said cam, an arm pivoted upon said rocking lever, spring tensioned means connecting the arm and the lever, a device pivoted to the free end of the arm movable yieldably transversely of the throat and penetrable yieldably between the quills to feed one quill at a time from the throat to the mouth, said device also acting as a quill checker.

20. In a quill stripping machine, a quill containing throat having a discharge mouth, a feeding mechanism for feeding one quill at a time from the throat to the mouth, a quill stripping mechanism including stripping jaws, means for reciprocating said jaws, a mechanism actuated by said reciprocating means for closing the jaws, a rock shaft having connections with and operated by the reciprocating means, an arm on one end of the rock shaft having a discharge member at its free end movable transversely of the mouth to discharge a quill.

21. In a quill stripping machine, a quill containing throat having a discharge mouth, a feeding mechanism for feeding one quill at a time from the throat to the mouth, a quill stripping mechanism including stripping jaws, means for reciprocating said jaws, a mechanism actuated by said reciprocating means for closing the jaws, a rock shaft having connections with and operated by the reciprocating means, an arm on one end of the rock shaft having a discharge member at its free end movable transversely of the mouth to discharge a quill, a hollow sleeve shaft rockable on the first rock shaft and provided with a lever, said sleeve shaft having connections with and operated by the reciprocating means, and a quill checking device having connections with and operated by the lever of the sleeve shaft for checking a greater part of the quills.

22. In a quill stripping machine, a quill containing throat having a discharge mouth, a mechanism including stripping jaws for stripping each quill, means for reciprocating said mechanism and including a cam, a spring tensioned rocking lever actuated by said cam, an arm pivoted upon said rocking lever, spring tensioned means connecting the arm and the lever, a device pivoted to the free end of the arm movable yieldably transversely of the throat and penetrable yieldably between the quills to feed one quill at a time from the throat to the mouth, said device also acting as a quill checker.

23. In a quill stripping machine having a magazine gravity feeding throat for feeding a series of quills and provided with a discharge mouth, a quill checking member to check the greater part of the series of quills against the gravity feed of the throat, a feeding mechanism comprising a feeding blade movable transversely of the throat for feeding each quill intermittently from the throat to the mouth, a pivoted lever having a laterally extending angular arm having a shoulder, a second lever pivoted to the first lever and being pivotally connected to the feeding blade, spring tensioned means connecting between the second lever and the angular arm to hold the second lever in contact with the shoulder and acting to permit the feeding blade to yield as it penetrates between the quills of the throat, a mechanism for actuating the first lever, means for stripping each quill, and a mechanism for intermittently discharging a quill from the mouth just before the feeding blade yieldably enters between the quill for feeding the same.

24. In a quill stripping machine having a quill throat and a discharge mouth and provided with a guide extending transversely from the throat, a quill feeding mechanism comprising a feeding blade movable laterally in the guide, a pivoted lever having a laterally extending angular arm provided with a shoulder, a second lever pivoted to the first lever normally in parallelism therewith, and being pivotally connected at its free end to the feeding blade, a pair of coil springs connecting between the second lever and the angular arm to hold the second lever in contact with said shoulder and acting to permit the feeding blade to yield as it penetrates between the quills.

25. In a quill stripping machine comprising a frame having a quill throat and a discharge mouth and provided with a feeding mechanism, a quill checking mechanism comprising an angular lever pivoted on the frame and having a portion bent downwardly toward the frame and designed to move rearwardly over the rear quill at the rear end of the discharge mouth to check the greater part of the quills, a rock shaft mounted in bearings of the frame, a rocking sleeve on the rock shaft, a lever connected to the rocking sleeve and having a link connection at its upper end to the quill checking member.

26. In a quill stripping machine comprising a frame having a quill throat and a discharge mouth and provided with a feeding mechanism, a quill checking mechanism comprising an angular lever pivoted on the frame and having a portion bent downwardly toward the frame and designed to move rearwardly over the rear quill at the rear end of the discharge mouth to check the greater part of the quills, a rock shaft mounted in bearings of the frame, a rocking sleeve on the rock shaft, a lever connected to the rocking sleeve and having a link connection at its upper end to the quill checking member, a quill discharging member including a mouth opening device having conections with said rock shaft, and means for operating the rock shaft and the rock sleeve whereby the discharging member will operate just before the quill checking member operates.

27. In a quill stripping machine comprising a frame having a quill throat and a discharge mouth, a pair of brackets on the frame, a transversely movable bar guided in said brackets and having a discharging member provided with an inclined edge to discharge a quill from the mouth, a mouth covering plate carried by the bar to uncover the mouth just before the discharging member discharges a quill, and means for actuating the bar.

28. In a quill stripping machine having a quill throat and a discharge mouth, a quill checking lever pivoted to move rearwardly to check the greater part of the quills, a transversely movable member mounted in guides of the machine provided with a mouth covering plate and a discharge blade, rockable means having connections with the member and the checking lever for actuating the member just before the checking lever is actuated, and means for operating the rocking means.

29. In a quill stripping machine having a quill throat and a discharge mouth, a quill checking member coöperating with the quills for checking them in the throat, a device designed to be reciprocated in guides of the frame of the machine and provided with a discharging blade and the mouth covering plate, a rock shaft mounted in bearings of the machine, a rock sleeve on the shaft, connections respectively between the rock shaft and the sleeve, and the checking member and the reciprocating device, and means for operating the rock shaft and sleeve whereby the reciprocating device is actuated just before the quill checking member is operated.

30. In a quill stripping machine having a gravity feeding throat for feeding a series of quills and provided with a discharge mouth, a quill checking member to check the greater part of the series of quills against the gravity feed, a feeding mechanism comprising a pivoted lever, a second lever pivoted to the first lever, yielding means between the two levers including an abutment shoulder to limit the second lever, a feeding member pivoted to the second lever penetrable yieldably between the quills for feeding each quill intermittently from the throat to the mouth, and means for actuating the first lever.

31. In a quill stripping machine having a gravity feeding throat for feeding a series of quills and provided with a discharge mouth, a quill checking member to check the greater part of the series of quills against the gravity feed, a feeding mechanism comprising a pivoted lever, a second lever pivoted to the first lever, yielding means between the two levers including an abutment shoulder to limit the second lever, a feeding member pivoted to the second lever penetrable yieldably between the quills for feeding each quill intermittently from the throat to the mouth, and means for actuating the first lever, means for stripping each quill, and means for intermittently discharging a quill from the mouth just before the yieldably mounted feeding member operates to feed the quills.

32. In a quill stripping machine, a quill throat, a discharge mouth adjacent thereto, adjustable quill holding jaws in the mouth and having opposite quill engaging teeth, a feeding member penetrable between the throat and the mouth, a pivoted lever having a lateral arm and provided with an abutment shoulder, a second lever pivoted to the first lever, spring means between the arm and the second lever to hold the same in contact with the shoulder and acting to permit the feeding member to yieldably engage between the quills, said second lever being pivoted to the feeding member, and means for actuating the first lever.

33. In a quill stripping machine, a quill throat, a discharge mouth, a transverse guide, a feeding blade movable in the guide and having an inclined edge to feed a quill from the throat to the mouth, a pivoted lever having yielding connections with the feeding blade, and means for actuating the pivoted lever, said yielding connections including limiting abutting means for said connections whereby said connections may positively withdraw the feeding blade from the throat.

34. In a quill stripping machine, a frame, an element mounted in bearings of the frame to be reciprocated and provided with a pair of stripping jaws, means for reciprocating said element, a member slidable on the element designed to be forced between the jaws to close the same, said reciprocating means including a revoluble shaft and a disk, link connections between the disk and the element, said shaft having a cam, a bracket on said frame, a spring tensioned device mounted in said bracket, an oscillatory lever pivoted in a bearing of the bracket and being connected to the spring tensioned device, said cam being designed to actuate the spring tensioned device which in turn actuates the lever for throwing the same in the path of a part of the slidable member to force the member between said jaws.

35. In a quill stripper, a quill throat, a mouth at the terminus of the throat, a laterally reciprocating element movable transversely of the throat and having a quill discharging tongue and a mouth covering lip carried by the element, said lip acting as a quill abutment, when a quill is fed into the mouth.

36. In a quill stripper, a quill throat, a mouth at the terminus of the throat, a laterally reciprocating element movable transversely of the throat and having a quill discharging tongue and a mouth covering lip carried by the element, said lip acting as a quill abutment, when a quill is fed into the mouth, and means to actuate said element to cause the tongue to discharge a quill and cause the lip to uncover the mouth.

37. In a quill stripper, a quill throat, a mouth at the terminus of the throat, a laterally reciprocating element, operating means therefor, a quill discharging tongue carried by the element to discharge a quill, and a combined mouth covering and quill abutting lip carried by the element to uncover the mouth when the element is operated, and means to return the element to its normal position withdrawing the tongue from the mouth and restoring the lip across the mouth.

38. In a quill stripper, a quill throat, a mouth at the terminus of the throat, a laterally reciprocating element, operating means therefor, a quill discharging tongue, carried by the element to discharge a quill, and a combined mouth covering and quill abutting lip carried by the element to uncover the mouth when the element is operated, and means to return the element to its normal position withdrawing the tongue from the mouth and restoring the lip across the mouth, a quill feeder, and means to actuate the feeder to feed a quill to the mouth immediately following the restoration of the lip and the withdrawing of the tongue from the mouth, the lip acting as an abutment for the quills.

In testimony whereof we have signed our names to this specification in the presence of two subscribing witnesses.

CHARLES S. SMART.
WALTER W. LINDER.

Witnesses:
S. J. TATUM,
H. E. BARNES.

Copies of this patent may be obtained for five cents each, by addressing the "Commissioner of Patents, Washington, D. C."